US 6,553,140 B1

(12) United States Patent
Soupliotis et al.

(10) Patent No.: US 6,553,140 B1
(45) Date of Patent: Apr. 22, 2003

(54) METHOD AND SYSTEM FOR SPILL CORRECTION

(75) Inventors: Andreas Soupliotis, Longueuil; Michel Eid, St-Laurent; Gilles Khouzam, LaSalle; Thomas P. Nadas, Montreal, all of (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/292,670

(22) Filed: Apr. 16, 1999

(51) Int. Cl.⁷ .............................. G06K 9/00; G06K 9/40; H04N 1/46
(52) U.S. Cl. ..................... 382/167; 358/518; 382/264
(58) Field of Search ................... 358/500, 515, 358/518, 520, 537; 382/255, 264, 266

(56) References Cited

U.S. PATENT DOCUMENTS

| | | | | |
|---|---|---|---|---|
| 4,007,487 A | | 2/1977 | Vlahos ................. 358/22 |
| 4,047,202 A | * | 9/1977 | Poetsch ................ 358/29 |
| 4,100,469 A | | 7/1978 | Vlahos ................. 358/22 |
| 4,109,278 A | | 8/1978 | Mendrala et al. ..... 358/22 |
| 4,319,266 A | | 3/1982 | Bannister ............. 358/22 |
| 4,344,085 A | | 8/1982 | Vlahos ................. 358/22 |
| 4,409,611 A | | 10/1983 | Vlahos ................. 358/22 |
| 4,589,013 A | | 5/1986 | Vlahos et al. ........ 358/22 |
| 4,625,231 A | | 11/1986 | Vlahos ................. 358/22 |
| 4,727,425 A | | 2/1988 | Mayne et al. ........ 358/80 |
| 4,873,568 A | | 10/1989 | Jackson et al. ...... 358/22 |
| 5,032,901 A | | 7/1991 | Vlahos ................. 358/22 |
| 5,249,039 A | | 9/1993 | Chaplin ............... 358/22 |
| 5,251,016 A | | 10/1993 | Delwiche ............. 358/22 |
| 5,301,016 A | | 4/1994 | Gehrmann ............ 348/586 |
| 5,313,275 A | | 5/1994 | Daly et al. ........... 348/592 |
| 5,313,304 A | | 5/1994 | Chaplin ............... 348/587 |
| 5,400,081 A | | 3/1995 | Chaplin ............... 348/587 |
| 5,424,781 A | | 6/1995 | Vlahos ................. 348/587 |
| 5,455,633 A | | 10/1995 | Gehrmann ............ 348/587 |
| 5,473,737 A | * | 12/1995 | Harper ................. 395/131 |
| 5,515,109 A | | 5/1996 | Vlahos et al. ........ 344/587 |
| 5,627,951 A | | 5/1997 | Chaplin et al. ....... 345/131 |
| 5,630,037 A | * | 5/1997 | Schindler ............. 395/131 |
| 5,742,354 A | | 4/1998 | Vlahos et al. ........ 348/586 |
| 5,831,685 A | | 11/1998 | Vlahos et al. ........ 348/587 |
| 5,907,315 A | | 5/1999 | Vlahos et al. ........ 345/114 |
| 5,940,140 A | | 8/1999 | Dadourian et al. .... 348/587 |
| 6,128,001 A | | 10/2000 | Gonsalves et al. .... 348/587 |
| 6,134,345 A | | 10/2000 | Berman et al. ....... 382/162 |
| 6,134,346 A | | 10/2000 | Berman et al. ....... 382/163 |
| 6,201,531 B1 | | 3/2001 | Gonsalves et al. .... 345/150 |
| 6,288,703 B1 | | 9/2001 | Berman et al. ....... 345/150 |
| 6,351,557 B1 | | 2/2002 | Gonsalves ............ 382/167 |
| 6,361,173 B1 | | 3/2002 | Vlahos et al. ........ 353/57 |
| 6,363,526 B1 | | 3/2002 | Vlahos et al. ........ 725/37 |

FOREIGN PATENT DOCUMENTS

| | | | | |
|---|---|---|---|---|
| WO | WO 98/11510 | * | 3/1998 | ......... G06T/11/00 |
| WO | WO 98/45811 | | 10/1998 | ......... G06T/11/00 |
| WO | WO 00/63839 | * | 10/2000 | ......... G06T/11/00 |

OTHER PUBLICATIONS

Abekas 8150 Operations Manual, Section 4, May 2000, pp. 4–1 –4–70.
Discreet Logic Inc., Enter* Guide, Apr. 1999, pp. 145–160.
Smith, A. R. and Blinn, J. F., Microsoft Corporation, "Blue Screening Matting", 1996, pp. 259–268.

* cited by examiner

*Primary Examiner*—Jerome Grant, II
(74) *Attorney, Agent, or Firm*—Peter J. Gordon

(57) ABSTRACT

A method and system for color correction in composite image. Spill in a foreground image can be keyed directly to produce a spill matte that can be displayed to a user. The user can apply suitable image processing to the spill matte to modify the eventual color correction to the composite image. The resulting spill matte is used as a template for the application of color correction in the composite image.

34 Claims, 5 Drawing Sheets

(1 of 5 Drawing Sheet(s) Filed in Color)

METHOD AND SYSTEM FOR SPILL CORRECTION

FIELD OF THE INVENTION

The present invention relates to computer-based editing systems and methods. More particularly, the present invention relates to a method and system for spill correction in a composite image.

BACKGROUND OF THE INVENTION

One of the advantages of computer-based digital editing systems is the ease with which a user can manipulate digital information to achieve a desired result. Such systems permit fine control of common editing and composition processes, and allow the user to view the eventual output during the editing process, and refine or tweak the edited information. An example of such a system is SOFTIMAGE|DS.

Compositing is the process of layering video "clips", and defining how and when their images overlap. A detailed description of the compositing process can be found at pp. 365–426 of the User's Guide for SOFTIMAGE|DS, the contents of which are incorporated herein by reference. A common compositing task is the layering of a foreground image over a background image. Typically, the foreground image consists of an object, such as an actor, that is filmed in front of a blue or green screen. The foreground image is then "keyed" to generate a "matte", which permits, after compositing, the background image to be visible in the formerly green or blue screen areas of the foreground image. A matte can be part of the image itself, or can be derived from another image. Keying the image is the process of creating a matte from a foreground clip, and can be based on hue-lightness-saturation (HLS), red-green-blue (RGB), or luminance (YUV) color values. Typically, the system provides a "keyer" interface that permits the user to access, and modify certain keying parameters.

"Chroma keying" is the process of generating the key matte to remove specified color components from a foreground clip, such as green or blue screen color. The key matte is a greyscale image that defines the transparency of a foreground clip when it is composited over another image. Generating the key matte computes the image's "alpha channel". An alpha channel is one of four channels, or components, of information that is contained within each pixel of an image. The alpha channel specifies the transparency of each pixel, allowing portions of the foreground image to reveal or block out corresponding portions of the background image when the two images are composited. Generally, the key matte is generated by processing HLS color values for each pixel in the image.

One difficulty with chroma keying is color correction, or "spill" correction, in the foreground object. Spill is a reflection of the blue or green screen color on the surface of the foreground object. Spill affects the quality of the key matte, and results in partial transparency of the foreground object. Generally, spill is most prevalent at the edges of a foreground object, but can occur over the remaining surface of the object as well.

In the prior art, this problem is addressed by applying certain image processing algorithms to the foreground object to tweak its opacity. Generally, spill correction is applied to the key matte automatically by choosing a spill correction option in the keyer. However, increasing the opacity of the foreground object creates a further problem. Because portions of the foreground image have been made less transparent, a greenish (or bluish in the case of a blue screen) tinge occurs in the foreground object where spill correction has been applied. This tinge, cast or halo effect is clearly undesirable in the final composite image. While a user can modify certain spill correction parameters, such as softness and threshold, within the keyer to reduce this tingeing, the spill correction available in the prior art is rather coarse, or crude.

It is, therefore, desirable to provide a method and system that permits a user to have finer control of the spill correction process.

SUMMARY OF THE INVENTION

In a first aspect of the present invention, there is provided a method for spill correction in a compositing process, comprising the steps of:
  (i) generating a spill matte containing color correction information relating to a foreground object;
  (ii) adjusting at least one property of the color correction information to modify the spill matte;
  (iii) displaying the modified spill matte; and
  (iv) applying the adjusted color correction information to an alpha channel of a foreground image.

In a further aspect of the present invention, there is provided a method for generating a spill matte for a foreground object, comprising the steps of:
  (i) examining color values for each pixel in a foreground object;
  (ii) determining if a spill color value for each pixel is greater than either of its other color values; and
  (iii) assigning a color correction value to each determined pixel.

In yet another aspect of the present invention, there is provided a system for keying spill in a foreground image, comprising:
  a means for generating a spill matte keyed to a spill color in a foreground image, the spill matte containing color correction information;
  a means for applying image processing functions to modify the spill matte;
  a means for displaying the spill matte after any modification; and
  a means for applying the color correction information to an alpha channel of the foreground image.

BRIEF DESCRIPTION OF THE DRAWINGS

Preferred embodiments of the present invention will now be described, by way of example only, with reference to the attached Figures, wherein.

The file of this patent contains at least one drawing executed in color: Copies of this patent with color drawing(s) will be provided by the Patent and Trademark Office upon request and payment of the necessary fee.

DETAILED DESCRIPTION

The present invention provides a system and method for editing digital information, such as digital video, digital audio, animations and the like, forming a multimedia production. In particular, the present invention provides a digital editing a system and method for chroma keying digital video images.

Figure 1:
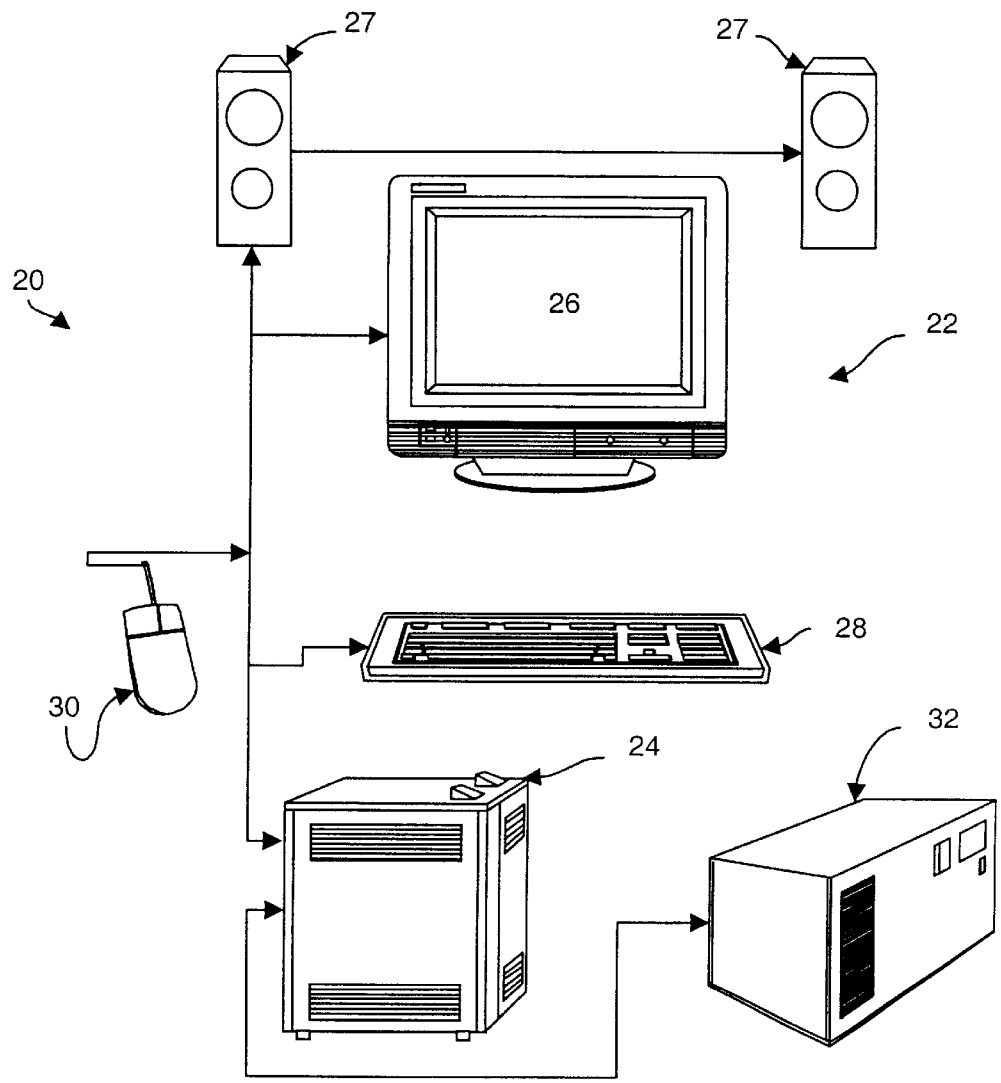
FIG. 1 is a schematic of an editing system according to an embodiment of the present invention.

A digital post-production editing system and apparatus is indicated generally at 20 in FIG. 1. System 20 comprises one or more workstations 22, each of which includes a general purpose computer 24, such as a personal computer with a 400 MHz Intel Pentium II processor executing the Windows NT v.4.0 operating system. Computer 24 is provided with an appropriate animation or digital post-production software application, such as SOFTIMAGE|3D v.3.7 or SOFTIMAGE|DS v.2.1. Computer 24 is equipped with one or more appropriate special purpose peripheral processor cards, such as a DigiSuite video card set manufactured by Matrox and a Kefren sound processing card manufactured by Merging Technologies. A video display 26, such as a 21 inch NEC Multisync monitor, and speakers 27, are operatively connected to computer 24, a number of input devices, such as a keyboard 30, a mouse 44, a digitizer, and/or an audio playback system (not shown). Workstations 22 could also include peripheral editing equipment such as video and audio tape, or disk, recording and playback devices.

Computer 24 is also operatively connected to a relatively large capacity random access storage means 32. In a presently preferred embodiment, storage means 32 comprises a RAID storage array, such as a model 6900 RAID storage device manufactured by Ciprico. Such RAID arrays are presently preferred as random access storage devices as they combine acceptable retrieval speed with large capacity, however any other suitable storage device can also be employed with the present invention, as will occur to those of skill in the art. For example, in some circumstances, for speed or other reasons, digital information can be stored in RAM in computer 24 while one or more projects are being prepared, or rendered with system 20. Accordingly, as used herein, the term "storage means" is intended to comprise a RAID storage device or the like, RAM memory in computer 24 and any other suitable random access storage techniques and/or devices wherein digital information can be maintained for use by system 20.

As will be understood by those of skill in the art, digital information is loaded onto storage means 32 by users as required. For example, video information from an analog source can be digitized to a desired resolution, or resolutions, and loaded onto storage means 32. Digital video information can be transferred directly to storage means 32, from optical disc, tape or other storage means, or via a network connection, still image source information, and any other desired source material can be digitized, if necessary, and loaded onto storage means 32 as desired. The loading of information onto a storage means is accomplished by loading directly from a desired source, or as the result of an intermediate rendering of an effect or the like.

Employing system 20, a 3D animation or other digitally edited scene can be composed and edited. In particular, employing the system and method of the present invention permits a user to have greater control over a color correction process.

Figure 2:
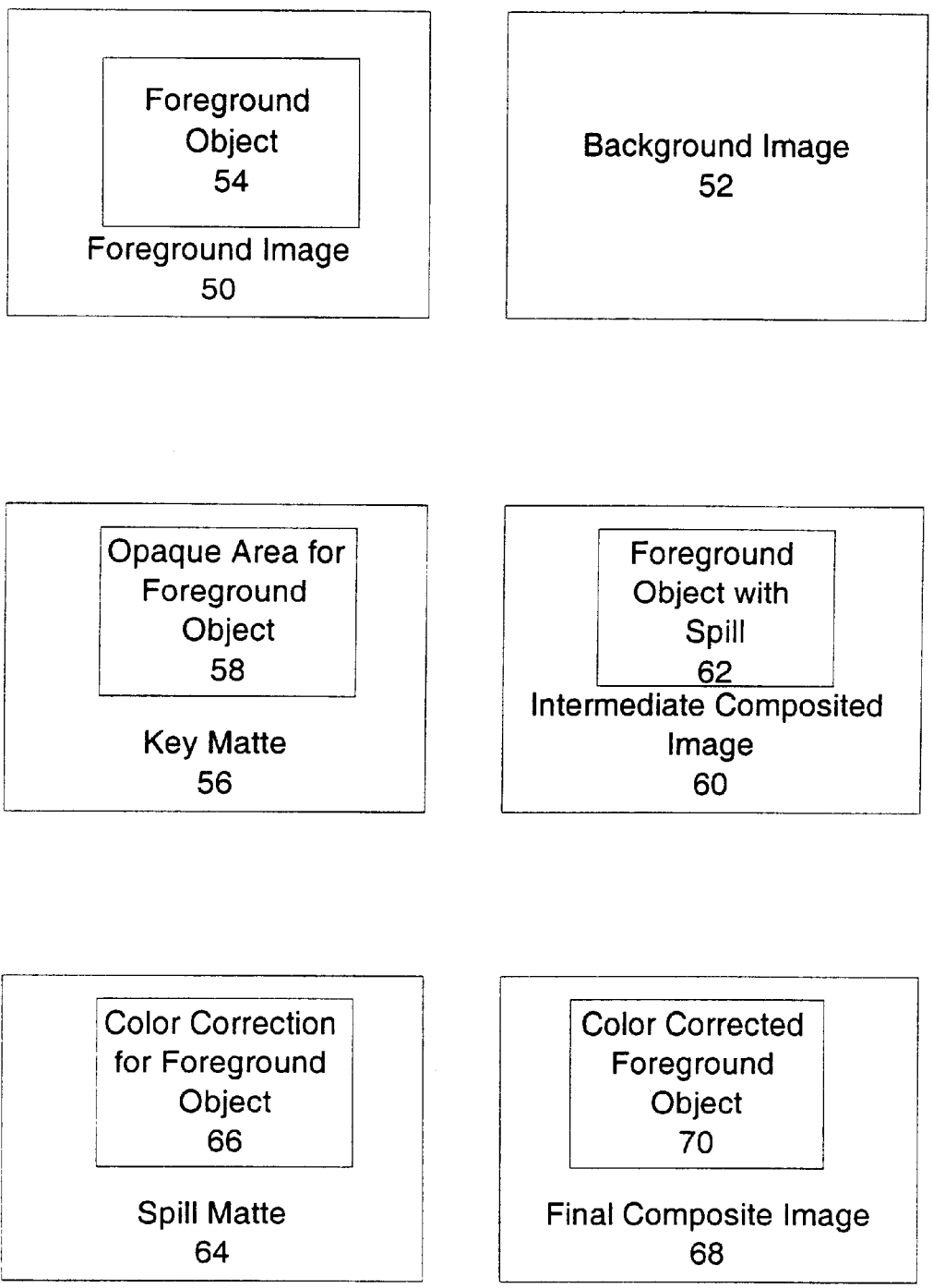
FIG. 2 is a schematic view of the color views shown in FIG. 3, and provides a key to those views.

For a clearer understanding of the following description, reference will be made to the color image views that are shown schematically in FIG. 2, and in color in FIG. 3. Reference will also be made to the flow charts depicted in FIGS. 3 and 4, where appropriate. Generally, the following description describes a method for compositing a foreground and a background image, a method for generating a spill matte, and a system for implementing the two methods.

The first two color views show a foreground image 50 and background image 52. The foreground image 50 includes a foreground object 54, in this case the picture of a woman, shot in front of a green screen. The background image 52, on which it is desired to layer foreground object 54, is a view of a desert landscape.

The first step, which is well known to those of skill in the art, is to key foreground image 50 to generate a key matte 56, which is represented by the third color view. The resulting key matte 56 is a greyscale image that depicts the transparency of foreground image 50 in the eventual composite. Areas that will be completely transparent to background image 52 are shown in black, while opaque areas 58 are shown in white. In this example, the white area is keyed to foreground object 54.

In the following color view of an intermediate composited image 60, the result of compositing the foreground image and background image, applying key matte 56, is shown. Noticeable spill in the foreground object 62, visible as the green tinge around the woman's chin and eyes, can be seen in this view. The color correction method and system of the present invention provide a means to correct for this spill. As used herein, color correction includes both chrominance and luminance correction.

Figure 4:
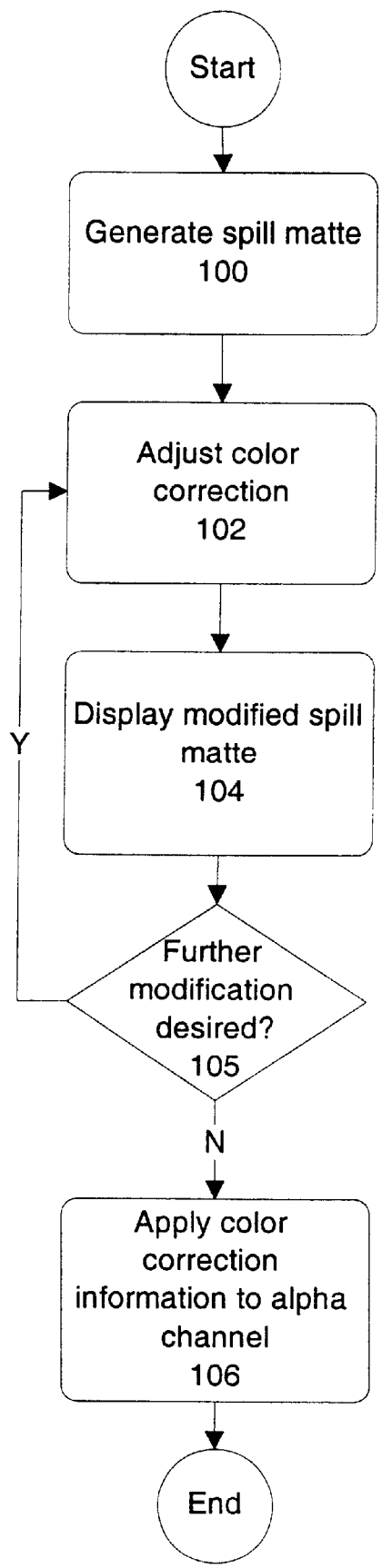
FIG. 4 is a flow chart of a method of color correction, according to the present invention.

A preferred embodiment of the color correction method of the present invention will be generally described with reference to the flow chart in FIG. 4. Generally, the method for color correction begins at step 100 where a spill matte is generated. The spill matte contains color correction information relating to foreground object. At step 102, the user can then adjust at least one property of the color correction information to modify the spill matte, which is then recalculated. The results of this modification are then displayed to the user at step 104. Typically, as shown at step 105, multiple modifications will be made by the user to tweak the spill matte and the resulting color correction. Finally, at step 106, the adjusted color correction information contained in the spill matte is applied to the alpha channel of the foreground image, and acts as a processing template in the compositing process. The user chooses an appropriate color to replace the spill color, and during compositing with the background image, the foreground image is processed, to replace the spill color with the replacement color according to the template provided by the spill matte.

Figure 3:
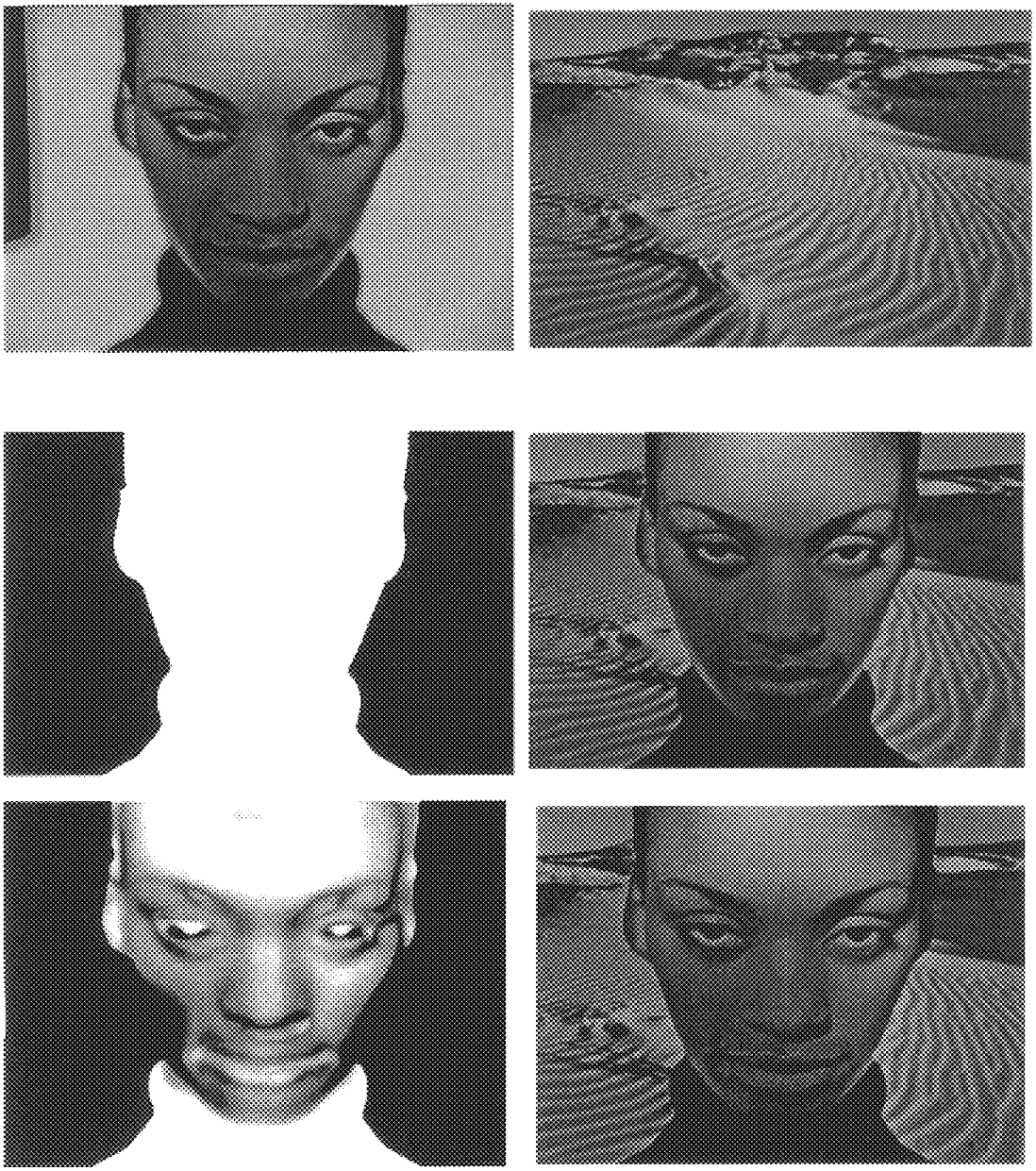
FIG. 3 is a sequence of color views illustrating a compositing method of the present invention.

Referring to FIG. 3, the spill matte 64 can be seen as a greyscale image. The color, varying from white to black, visually indicates the amount of color correction that will be applied to the foreground image, which is directly related to the amount of spill present in a given portion of the image. In a presently preferred embodiment, white indicates areas where no color correction is to be applied, black indicates areas where full color correction is to be applied, while the amount of color correction to be applied in the gray areas varies proportionately to their color. This visible spill matte permits a user to view the color correction that will be applied to the resulting composite image, and to modify the color correction as appropriate.

The spill matte shown in FIG. 3 has significant spill over the whole of the foreground object 66. The spill noted in the previous view of the intermediate composited image 60, is clearly apparent in the nearly wholly black regions around the chin, eyes and forehead. However, spill matte 64 makes it visually apparent that significant spill is present throughout the image. Such a graphical representation permits a user to intuitively understand the effect that the spill correction will have, and to visualize the effect of any modification to the spill correction.

Figure 5:
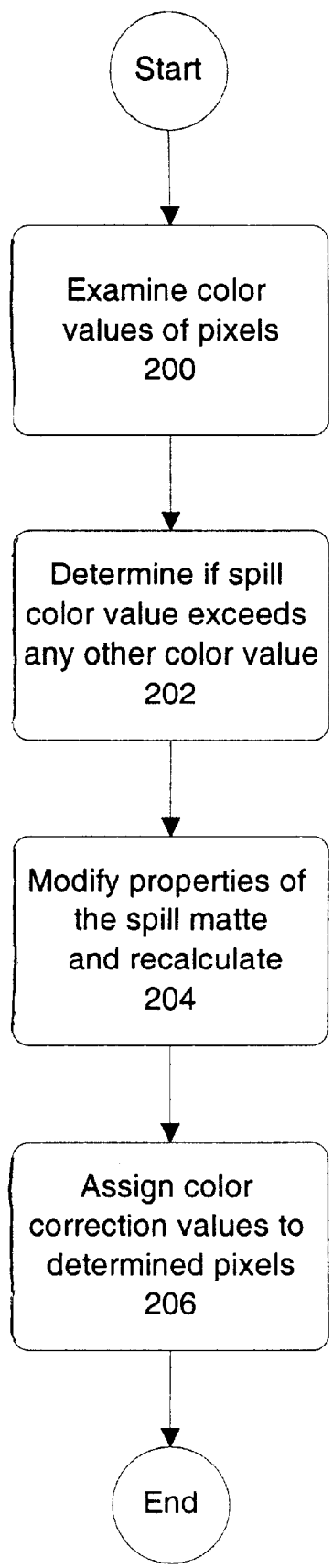
FIG. 5 is a flow chart of a method for generating a spill matte according to the present invention.

Referring to FIG. 5, a method for generating spill matte 64 is illustrated. As is well known to those of skill in the art, a key matte is generated by examining HLS color values for in a foreground image. In a presently preferred embodiment of the present method, a spill matte keyer examines the RGB color values of each pixel in the foreground object, as shown at step 200. The spill matte keyer then determines, at step 202, if a normalized spill color value for each pixel is greater than either of its other color values. For example, if the spill color is green, the keyer determines whether the normalized green color value of a particular pixel is greater than the maximum value of either the normalized red or blue color values.

At step 204, the user can modify the manner in which the spill matte is generated. Firstly, the user can set a threshold value to increase or decrease the keyer's sensitivity to spill. The threshold value is subtracted from the maximum value determined above, and the spill matte is recalculated. Therefore, a positive threshold value will increase the sensitivity to spill color components in each pixel, and a negative threshold value will decrease the sensitivity to spill.

The user can also set a softness value to control the amount of color correction to be applied to each pixel. With a softness value of zero, any pixel determined to require color correction will receive full color correction, and will be visible in the spill matte in black. Softening the color correction expands the range of pixels to which color correction will be applied and results in a scaled color correction that depends on the amount by which a pixel's spill component exceeds its other color components.

As is well known to those skilled in the use of matte keyers, a number of other image processing functions can be likewise modified or applied to the matte. For example, pre- or post-blur can be applied to the matte to blur the color correction effect. Shrink/grow effects that affect the edge of the foreground object can be added. And, min/max settings can be adjusted. Generally, these properties will be adjusted at step 102, above.

Once all desired modifications have been made, the keyer then assigns, at step 206, a color correction value to each pixel determined to require correction, at a value determined in accordance with any modified properties.

Finally, referring once again to the color views in FIG. 3, the final view shows the composite image 68 after color correction according to the present invention. A color, closely approximating the skin color of the woman, is chosen for the color correction itself, and is adjusted in chrominance and luminance according to the spill matte. A comparison between the intermediate composited image 60 and the final composited image 68, with a color corrected foreground object 70, reveals some of the advantages of the present invention. By permitting the user is to treat spill as a keyable property, produce a spill matte adjusted for threshold and softness, view the spill matte, and apply the image processing functions as is known for conventional key mattes, the user has much greater control of color correction, and can more readily refine the color correction of a composited image.

It will be apparent to those skilled in the art that the foregoing is by way of example only. Modifications, variations and alterations may be made to the described embodiments without departing from the scope of the invention which is defined solely in the claims.

We claim:

1. A method for spill correction in a compositing process, comprising:
   generating a spill matte associated with color correction information relating to a foreground object;
   modifying the spill matte;
   displaying the modified spill matte; and
   applying the modified spill matte to an alpha channel of a foreground image to control application of the color correction information to the foreground image.

2. A method according to claim 1, wherein generating the spill matte includes:
   examining color values for each pixel in the foreground object;
   determining if a spill color value for each pixel is greater than either of its other color values, less a threshold value, and a softness value; and
   assigning a color correction value to each determined pixel.

3. A method according to claim 1, wherein modifying the spill matte includes adjusting any of softness, threshold, min/max, pre-blur, post-blur and shrink/grow properties.

4. A method according to claim 1, wherein the spill matte is displayed as a greyscale image.

5. A method according to claim 1, wherein generating the spill matte follows keying the foreground image to generate a key matte.

6. A method according to claim 1, wherein the color correction information includes chrominance correction and luminance correction.

7. A method according to claim 1, further including determining a replacement color for effecting the color correction.

8. A method for generating a spill matte for a foreground object, comprising:
   examining color values for each pixel in a foreground object;
   determining if a spill color value for each pixel is greater than either of its color values; and
   assigning a color correction value to each determined pixel.

9. A method in accordance with claim 8, wherein the color values include red, green and blue color values.

10. A method in accordance with claim 9, wherein the spill color value is the green color value.

11. A method in accordance with claim 9, wherein the spill color value is the blue color value.

12. A method in accordance with claim 8, wherein the other color values are reduced by a threshold value.

13. A method in accordance with claim 8, wherein the other color values are reduced by a softness value.

14. A system for keying spill in a foreground image, comprising:
   means for generating a spill matte keyed to a spill color in a foreground image, the spill matte being associated with color correction information;
   means for applying image processing functions to modify the spill matte;
   means for displaying the spill matte after any modification; and
   means for applying the spill matte to an alpha channel of the foreground image to control application of the color correction information to the foreground image.

15. A method for performing spill correction on an image composited from a foreground image and a background image according to a key color, comprising:

generating a spill matte representing areas of spill of the key color on an object in the foreground image;

receiving adjustments that modify the spill matte;

displaying the modified spill matte; and applying a spill correction operation to the areas of spill designated by the spill matte.

16. The method of claim 15, wherein applying the spill correction operation comprises:

processing the foreground image to replace the areas of spill designated by the spill matte with a replacement color.

17. The method of claim 15, wherein adjustments that modify the spill matte include adjustments to softness representing an amount of correction to be applied to each pixel in areas of spill.

18. The method of claim 15, wherein adjustments that modify the spill matte include adjustments to a threshold value designating sensitivity of a keyer to spill.

19. The method of claim 15, wherein adjustments that modify the spill matte include a pre-blur operation on the spill matte.

20. The method of claim 15, wherein adjustments that modify the spill matte include a post-blur operation on the spill matte.

21. The method of claim 15, wherein adjustments that modify the spill matte include a shrink operation on the spill matte.

22. The method of claim 15, wherein adjustments that modify the spill matte include a grow operation on the spill matte.

23. The method of claim 15, wherein adjustments that modify the spill matte include a minimum operation on the spill matte.

24. The method of claim 15, wherein adjustments that modify the spill matte include a maximum operation on the spill matte.

25. A computer program product, comprising:

a computer readable medium;

computer program instructions stored on the computer readable medium that, when executed by a computer, instruct the computer to perform a process for correcting spill in an image composited from a foregoing image and a background image according to a key color, comprising:

generating a spill matte representing areas of spill of the key color on an object in the foreground image;

receiving adjustments that modify the spill matte;

displaying the modified spill matte; and applying a spill correction operation to the areas of spill designated by the spill matte.

26. The computer program product of claim 25, wherein applying the spill correction operation comprises:

processing the foreground image to replace the areas of spill designated by the spill matte with a replacement color.

27. The computer program product of claim 25, wherein adjustments that modify the spill matte include adjustments to softness representing an amount of correction to be applied to each pixel in areas of spill.

28. The computer program product of claim 25, wherein adjustments that modify the spill matte include adjustments to a threshold value designating sensitivity of a keyer to spill.

29. The computer program product of claim 25, wherein adjustments that modify the spill matte include a pre-blur operation on the spill matte.

30. The computer program product of claim 25, wherein adjustments that modify the spill matte include a post-blur operation on the spill matte.

31. The computer program product of claim 25, wherein adjustments that modify the spill matte include a shrink operation on the spill matte.

32. The computer program product of claim 25, wherein adjustments that modify the spill matte include a grow operation on the spill matte.

33. The computer program product of claim 25, wherein adjustments that modify the spill matte include a minimum operation on the spill matte.

34. The computer program product of claim 25, wherein adjustments that modify the spill matte include a maximum operation on the spill matte.

* * * * *